(12) United States Patent
Miyamoto et al.

(10) Patent No.: US 9,448,450 B2
(45) Date of Patent: Sep. 20, 2016

(54) DISPLAY DEVICE

(71) Applicant: Japan Display Inc., Tokyo (JP)

(72) Inventors: Mitsuhide Miyamoto, Tokyo (JP); Toshihiro Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 129 days.

(21) Appl. No.: 14/061,951

(22) Filed: Oct. 24, 2013

(65) Prior Publication Data
US 2014/0111725 A1    Apr. 24, 2014

(30) Foreign Application Priority Data
Oct. 24, 2012 (JP) .................................. 2012-235047

(51) Int. Cl.
*G02F 1/1362* (2006.01)
(52) U.S. Cl.
CPC ............................... *G02F 1/136213* (2013.01)
(58) Field of Classification Search
CPC ................................................ G02F 1/136213
USPC ........................................................ 349/47
See application file for complete search history.

(56) References Cited

U.S. PATENT DOCUMENTS

| | | |
|---|---|---|
| 2002/0074936 A1 | 6/2002 | Yamazaki et al. |
| 2007/0029613 A1 | 2/2007 | Moriwaki |
| 2011/0227079 A1* | 9/2011 | Son .................... H01L 29/66757 257/59 |
| 2012/0223311 A1* | 9/2012 | Endo .................... H01L 29/7869 257/57 |

FOREIGN PATENT DOCUMENTS

| | | |
|---|---|---|
| JP | 2004-333858 A | 11/2004 |
| JP | 2005-115104 A | 4/2005 |
| JP | 2007-041433 A | 2/2007 |
| JP | 2008-40399 | 2/2008 |
| JP | 2008-139656 A | 6/2008 |
| JP | 2012-022787 A | 2/2012 |
| JP | 2012-169285 A | 9/2012 |

OTHER PUBLICATIONS

Japanese Office Action mailed on Feb. 9, 2016 for Corresponding Japanese Patent Application No. 2012-235047.

* cited by examiner

*Primary Examiner* — Charles Chang
(74) *Attorney, Agent, or Firm* — Typha IP LLC

(57) ABSTRACT

A display device is provided with high definition and improved display capabilities. The display device includes a plurality of pixels, each of the plurality of pixels being arranged with a thin film transistor and a condenser; wherein the condenser includes a protruding portion arranged at a certain height above a substrate, a first electrode arranged on the protruding portion, an insulation film arranged on the first electrode, and a second electrode arranged on the insulation film.

18 Claims, 14 Drawing Sheets

(a)    11a (b)    11b (c)    11c (a)

(b)

(a)

(b)

DISPLAY DEVICE

CROSS-REFERENCE TO RELATED APPLICATIONS

This application is based upon and claims the benefit of priority from the prior Japanese Patent Application No. 2012-235047, filed on 24 Oct. 2012, the entire contents of which are incorporated herein by reference.

FIELD

The present invention is related to a display device controlling display gradation of each pixel using a thin film transistor.

BACKGROUND

In recent years, display devices such liquid crystal display devices, Organic Electroluminescence display devices etc., for controlling the display gradation of each pixel using thin film transistors (TFT) are being developed. The realization of high definition display panels in these display devices is being required by reducing the area occupied by a pixel circuit arranged with a thin film transistor and condenser etc., in each pixel.

Consequently, a conventional liquid crystal display device has been proposed in which a condenser (retention volume) which holds the potential of a pixel electrode for a fixed period is formed in a side wall of a trench structure (groove structure) formed on a substrate, a drop in an aperture ratio is continually prevented by arranging the condenser in a narrow region on the substrate and the potential retaining characteristics of the pixel electrode are improved (for example, refer to patent document 1 [Japanese Published Unexamined Publication 2008-40399]).

However, as in the liquid crystal display device described above, In the case of forming a condenser using a side wall of a trench structure formed on a substrate, there was a problem whereby the burden on the manufacturing process increases because it is necessary to form a plurality of fine groves on a glass substrate formed with a thin film transistor.

The present invention attempts to solve the problem described above by forming a pixel circuit including a condenser which can hold a required electric charge without increasing the area occupied in each pixel in a simple manufacturing process and thereby provide a display device with high definition and improved display capabilities.

SUMMARY

According to one embodiment of the present invention, a display device is provided including a plurality of pixels arranged in a matrix shape on a substrate at a position where a plurality of control signal lines and a plurality of data signal lines intersect, and a plurality of pixel circuits arranged corresponding to the plurality of pixels respectively, the plurality of pixel circuits receiving a data voltage supplied from the plurality of data signal lines, wherein each of the plurality of pixel circuits includes a thin film transistor controlling programming of the data voltage supplied to each of the plurality of pixels according to a control signal supplied from the plurality of control signal lines, and a condenser holding the data voltage, the condenser includes a protruding portion arranged at a certain height above the substrate, a first electrode arranged on the protruding portion, an insulation film arranged on the first electrode, and a second electrode arranged on the insulation film.

The thin film transistor may also include a stacked structure including a semiconductor layer, a gate insulation film and a gate electrode layer, and the first electrode of the condenser is the semiconductor layer, the insulation film of the condenser is the gate insulation film, and the second electrode of the condenser is the gate electrode layer.

The thin film transistor may also include a stacked structure including a agate electrode layer, an interlayer insulation film and a wiring layer, and the first electrode of the condenser is the gate electrode layer, the insulation film of the condenser is the interlayer insulation film, and the second electrode of the condenser is the wiring layer.

The pixel may also include an organic EL element and a bank layer may be arranged at a position overlapping the condenser. In addition, the pixel may also include a liquid crystal layer.

The present invention attempts to solve the problem described above by forming a pixel circuit including a condenser which can hold a required electric charge without increasing the area occupied in each pixel in a simple manufacturing process and thereby provide a display device with high definition and improved display capabilities.

DESCRIPTION OF EMBODIMENTS

Figure 1:
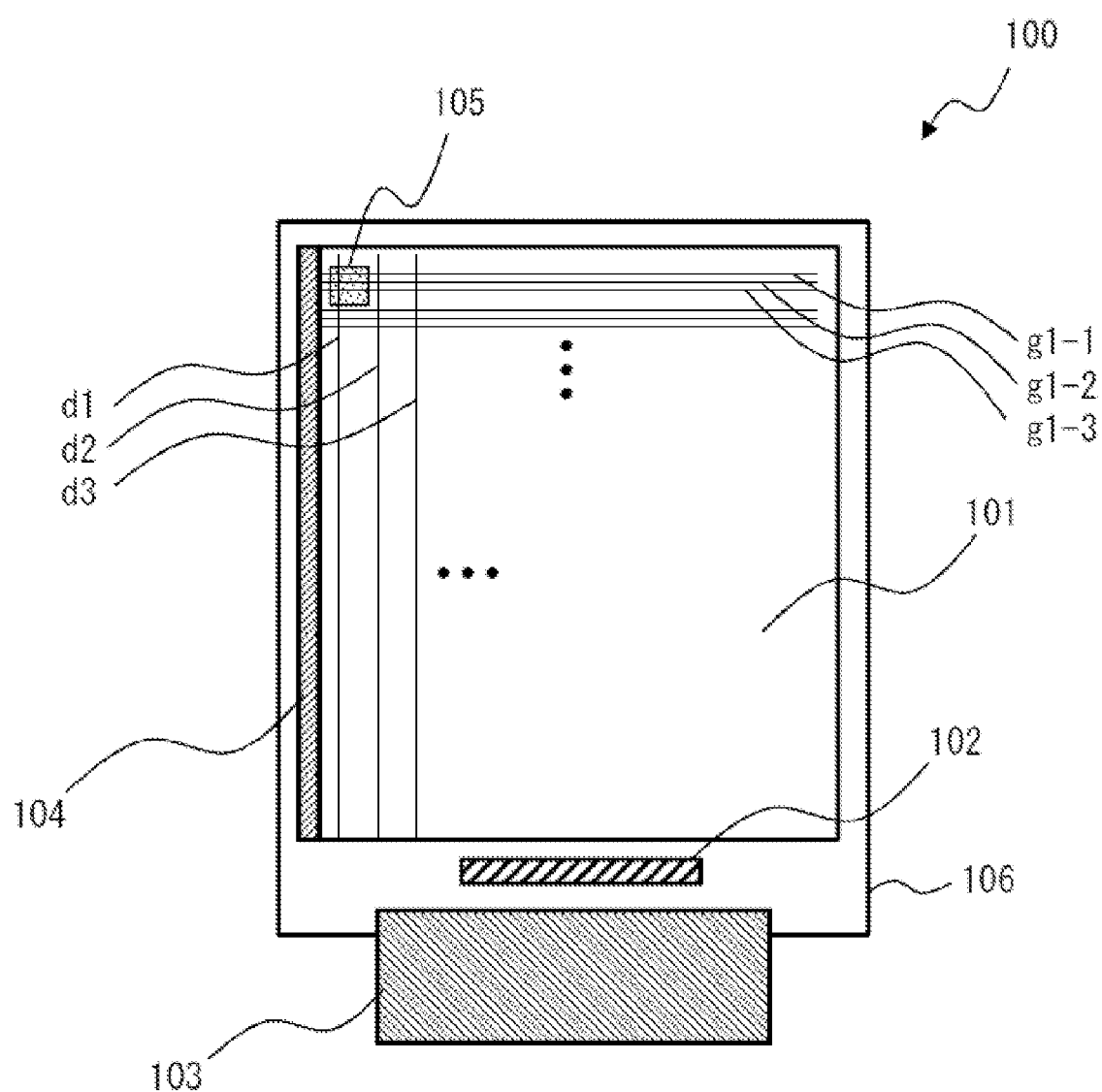
FIG. 1 is a planar diagram showing an approximate structure of a display device related to one embodiment of the present invention.

Embodiments of the display device of the present invention are explained below while referring to the drawings. Furthermore, various modifications of the display device of the present invention can be performed without limiting the invention to the embodiments described below.

An approximate structure of a display device 100 related to one embodiment of the present invention is shown in FIG. 1. The display device 100 related to the present embodiment is arranged with a display region 101, a driver IC 102, FPC (Flexible printed circuits) 103 and a scanning line drive circuit 104 formed on a substrate 106. In the display region 101, a plurality of control signal lines g1-1~g1-3 running in a horizontal direction and a plurality of data signal lines d1~d3 running in vertical direction in the diagram are arranged intersecting each other, and a plurality of pixels 105 are arranged in a matrix shape in a position corresponding to the intersection point of the control signal lines g1-1~g1-3 and data signal lines d1~d3. A structure in which three control signal lines g1-1~g1-3 and three data signal lines d1 per pixel are arranged intersecting each other is shown in FIG. 1 as one example. However, the present invention is not limited to this structure. In addition, although not shown in the diagram, wiring which supplies a constant voltage such as a power source line may also be arranged within the display region 101. A pixel circuit arranged with a thin film transistor which controls light emitted from a pixel 105 and a condenser which holds a data voltage supplied from the data signal lines d1~d3 by controlling programming of a data voltage supplied to a pixel 105 according to a control signal supplied from the control signal lines g1-1~g1-3 is arranged in each pixel 105.

Figure 2:
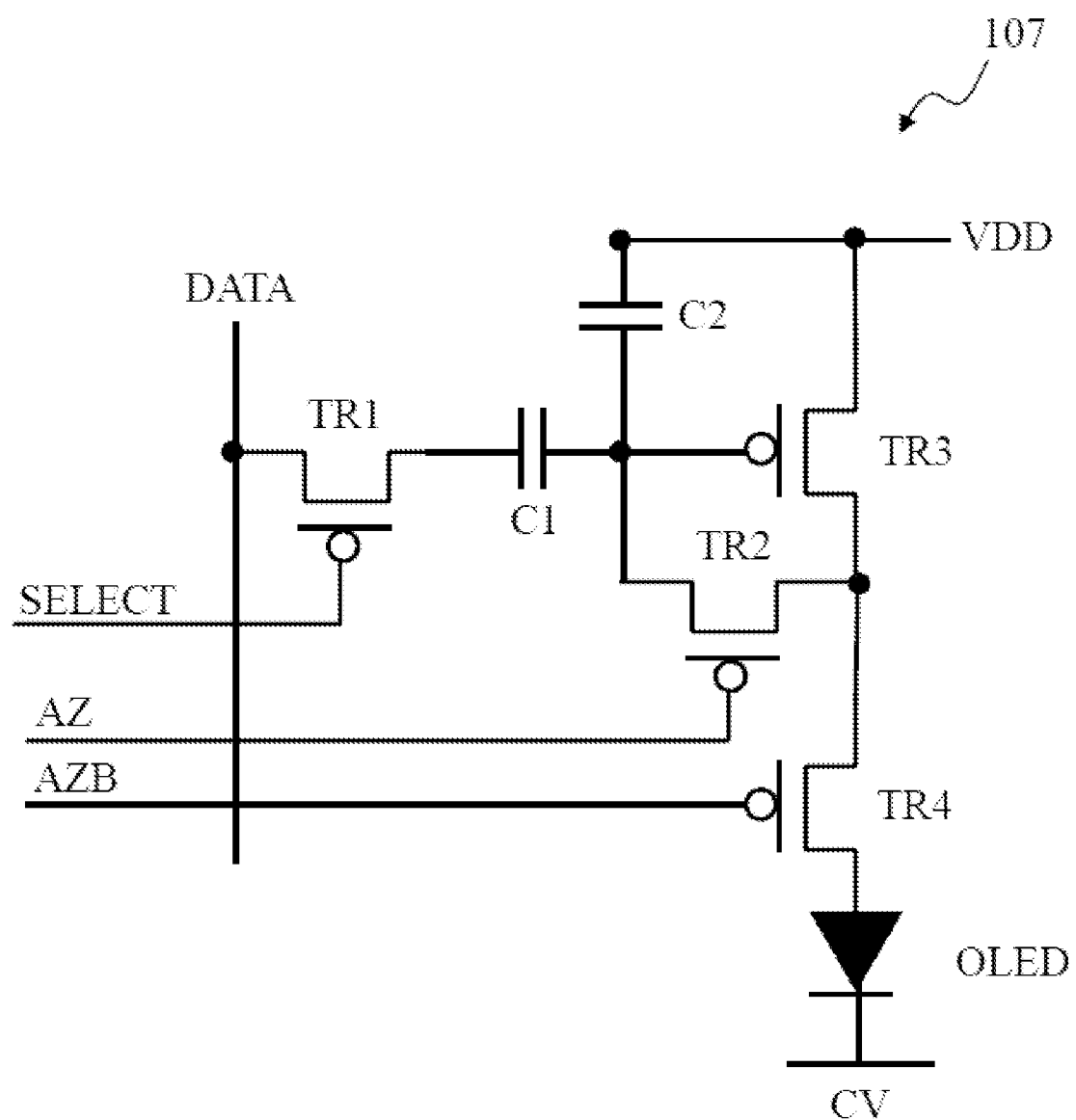
FIG. 2 is a circuit diagram showing an example of a pixel circuit used in the display device related to one embodiment of the present invention.

An example of a pixel circuit 107 used in the display device 100 related to one embodiment of the present invention is shown in FIG. 2. FIG. 2 is a circuit diagram which shows an example of the pixel circuit 107 used in an organic EL display device. Furthermore, although an organic EL display device is explained as an example of the display device 100, the display device related to one embodiment of the present invention is not limited to an organic EL display device and may be a liquid crystal display device as long as the display device controls display gradation of each pixel using a thin film transistor. For example, although not shown in FIG. 1, the display device 100 may also be a liquid crystal device arranged with a liquid crystal layer arranged for each pixel 105 between the substrate 105 and an opposing substrate arranged facing the substrate 106 and a backlight for supplying light to the liquid crystal layer. In addition, although not shown in FIG. 1, each pixel 105 may be arranged with a light emitting diode which emits light at an intensity according to a supplied current and in this case, the display device may also be a self-luminous type display device such as an organ EL display device.

As is shown in FIG. 2, the pixel circuit 107 of each pixel 105 may be arranged with four transistors TR1~TR4, two condensers C1 and C2 and an organic EL elements OLED. The source of the transistor TR1 is connected to a data voltage line DATA (data signal line d1 shown in FIG. 1), the drain is connected to one electrode of the condenser C1 and the gate is connected to a scanning electrode line SELECT (control signal line g1-1 shown in FIG. 1). The source of the transistor TR2 is commonly connected to the other electrode of the condenser C1, to one electrode of the condenser C2 and the gate of the transistor TR3, the drain is commonly connected to the drain of the transistor TR3 and the source of the transistor TR4, and the gate is connected to the control signal line AZ (control signal line g1-2 shown in FIG. 1). The drain of the transistor TR4 is connected to an anode of the organic EL element OLED, and the gate is connected to the control signal line AZB (control signal line g1-3 shown in FIG. 1). A power source voltage CV is supplied to the cathode of the organic EL element OLED, and a power source voltage VDD is supplied to the source of the transistor TR3 and the other electrode of the condenser C2.

By configuring the pixel circuit 107 with this structure, variation in an operation threshold voltage of the transistor TR3 is corrected by holding the voltage in the condensers C1, C2 etc., and thereby it becomes possible to for the organic EL element OLED to emit light with a luminosity accurately corresponding to a data voltage supplied from the data voltage line. As a result, the pixel circuit 107 configured with the structure shown in FIG. 2 is used in a display device arranged with a light emitting diode such as an organic EL display device in which variation in the characteristics of a transistor appear directly on a display.

However, in order to realize a display panel with high definition, the area of each pixel 105 tends to decrease and it was difficult to arrange the pixel circuit 107 arranged with a plurality of transistors TR1~TR3 and a plurality of condensers C1, C2 as is shown in FIG. 2 in a limited small region while considering the aperture of the pixel 105. Thus, the inventors of the present invention arrived at the present invention by examining a condenser structure in which a volume sufficient for meeting the display capabilities of a display device can be secured without increasing the area taken up by a condenser among the pixel circuits.

Figure 3:
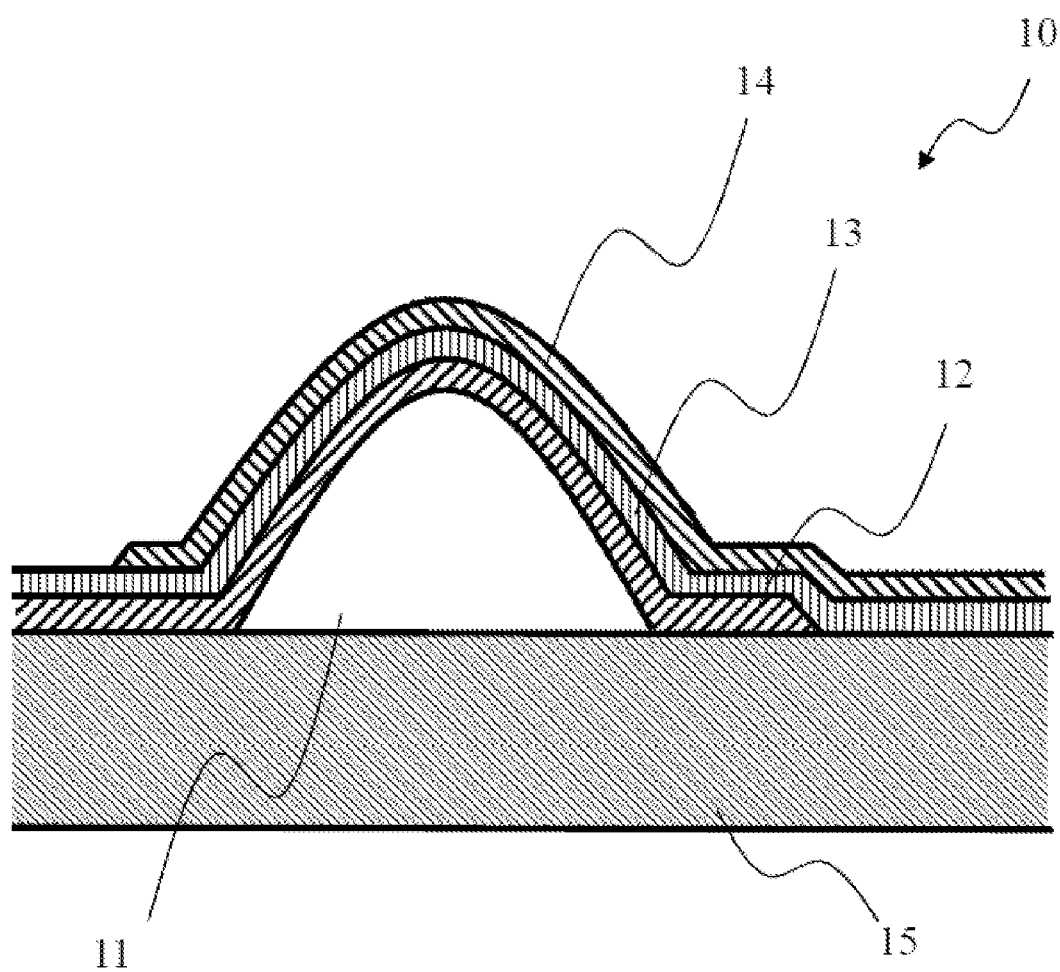
FIG. 3 is a cross-sectional diagram showing an approximate structure of a condenser included in a pixel circuit used in the display device related to one embodiment of the present invention.
Figure 4:
FIG. 4 is a diagram showing an example of the shape of a protruding portion included in a pixel circuit used in the display device related to one embodiment of the present invention.
Figure 4:
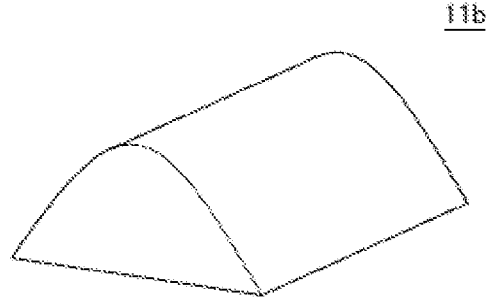
Figure 4:
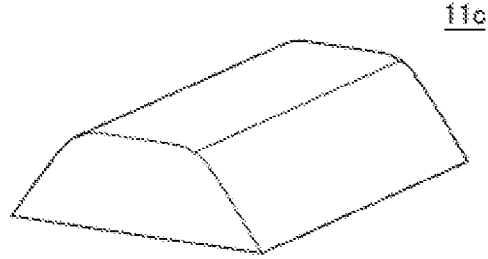
Figure 10:
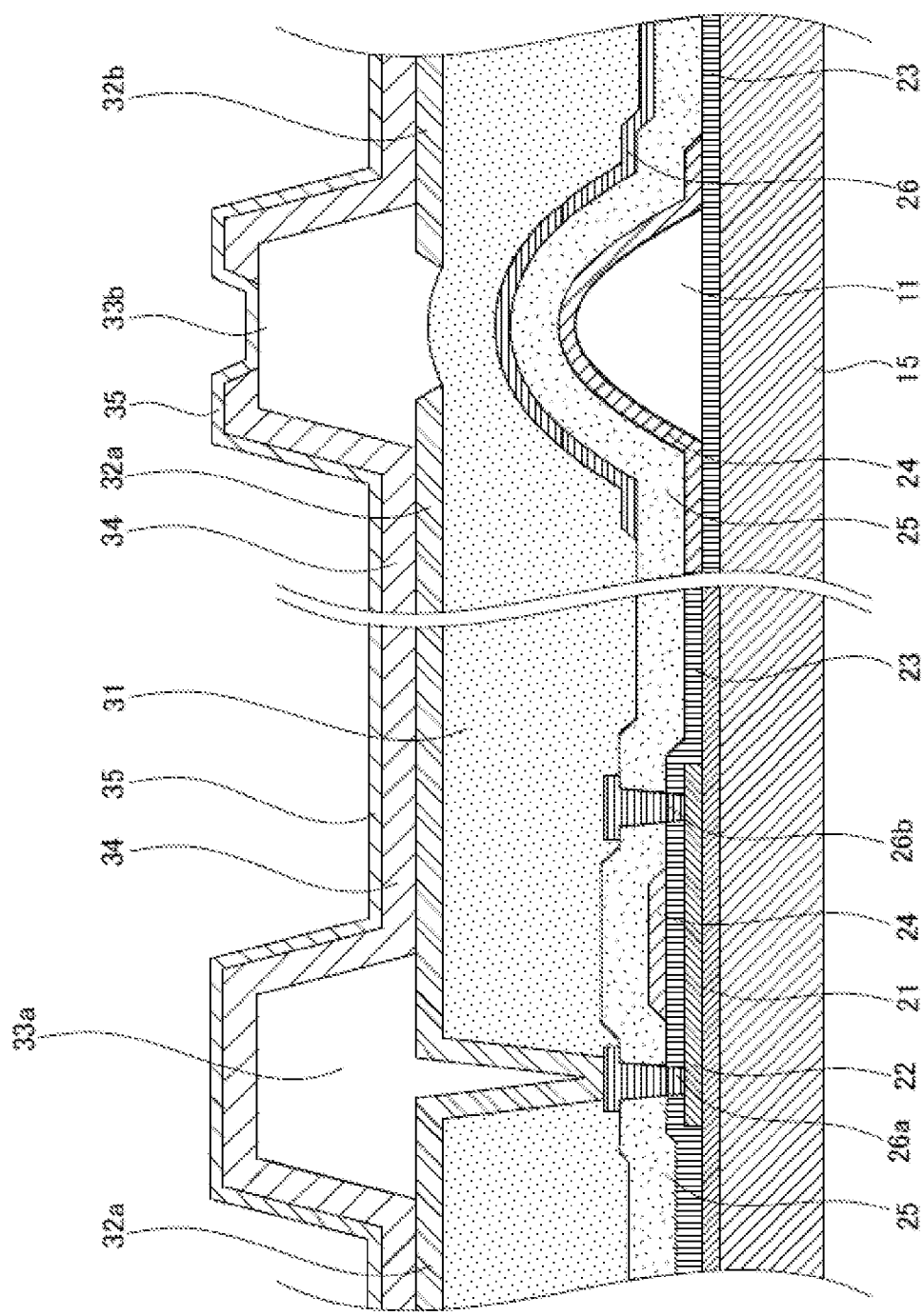
FIG. 10 is a diagram showing an approximate structural example of a display device including a pixel circuit arranged with the condenser related to the second embodiment shown in FIG. 9.

The structure of a condenser 10 arranged in a pixel circuit used in the display device 100 related to one embodiment of the present invention is explained herein while referring to FIG. 3 and FIG. 4. FIG. 3 is a cross-sectional diagram which shows an approximate structure of the condenser 10 arranged in a pixel circuit used in the display device 10 related to one embodiment of the present invention. FIG. 10 is a diagram which shows an example of the shape of a protruding portion included in a pixel circuit used in the display device 100 related to one embodiment of the present invention.

As is shown in FIG. 3, the condenser 10 arranged in a pixel circuit used in the display device 10 related to one embodiment of the present invention includes a protruding portion 11 formed on a substrate 15, a first electrode 12 formed on the protruding portion 11, an insulation film 13 formed on the first electrode 12 and a second electrode 14 formed on the insulation film 13. By adopting this type of structure it is possible to form the condenser 10 using the first electrode 12 and the second electrode 14.

A silicon oxide film or silicon nitride film may be formed on the substrate 14 which is a glass substrate and the protruding portion 11 may be formed for example by patterning this film or by using a light-curing resin such as a resist. The substrate 15 is not limited to a glass substrate and may also be a silicon substrate. The protruding portion 11 includes a peak part formed with a height of around 1 µm~10 µm from the substrate 15 and includes a protruding shape arranged with a sloping surface which connects to the substrate 15 from the peak part. For example, the protruding portion 11 may also be formed with a mountain shape which has a smooth sloping surface such as the protruding portion 11a exemplified in FIG. 4 (a) or may include a structure in which the mountain shape is elongated in a line shape such as the protruding part 11b exemplified in FIG. 4 (b). In addition, the protruding portion 11 may also include a structure in which the peak part of the protruding portion 11b exemplified in FIG. 4 (b) is formed flat such as the protruding portion 11c exemplified in FIG. 4 (c). In this way, the shape of the protruding portion 11 is not limited to the shapes exemplified in FIG. 4 (a)~(c) as long as the shape of the protruding portion 11 is a protruding shape with a peak part formed with a height of around 1 µm~10 µm from the substrate 15 and includes a sloping surface which connects to the substrate 15 from the peak part. In addition, a protruding shape with a smooth sloping surface with no corners is preferred. By adopting a protruding shape with a smooth sloping surface with no corners it is possible to prevent breaks in the first electrode 12, the insulation film 13 and the second electrode 14 which are formed in order on the protruding part 11.

First Embodiment

Figure 5:
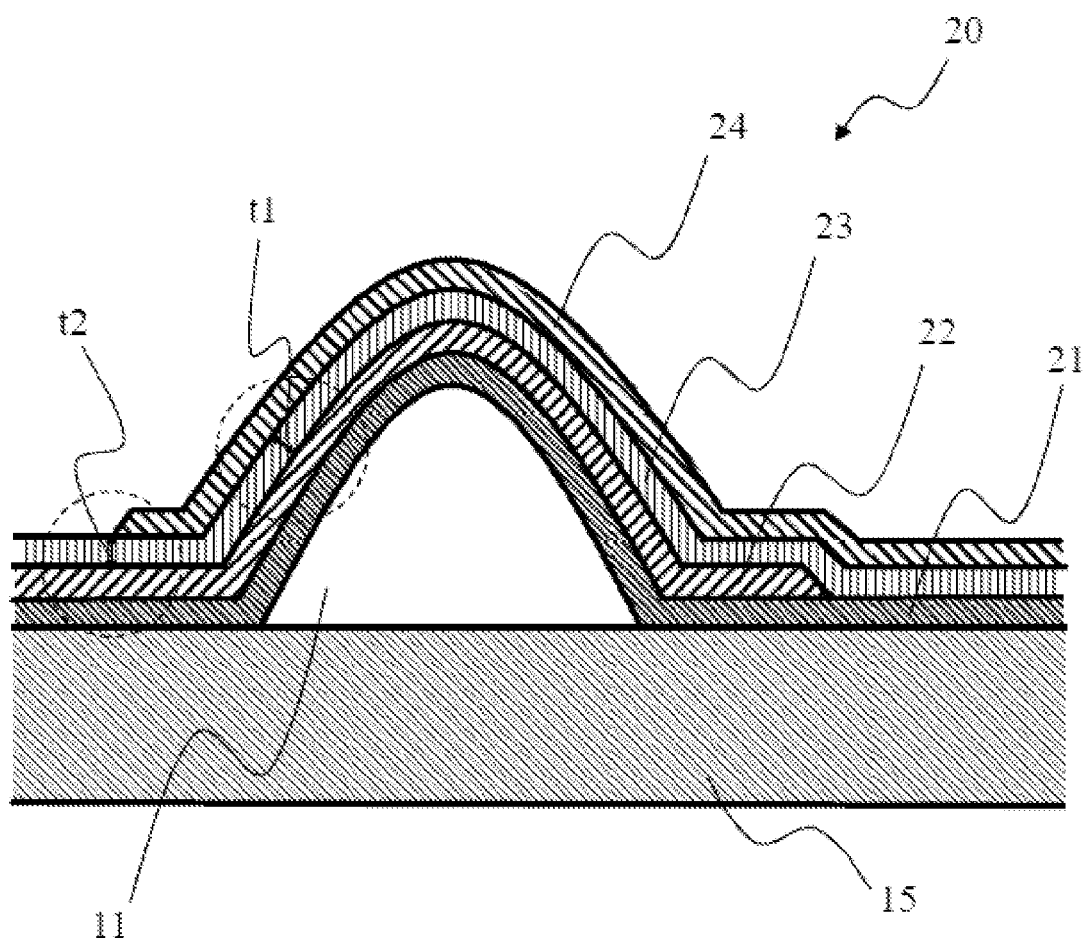
FIG. 5 is a cross-sectional diagram showing an approximate structure of a condenser related to a first embodiment included in a pixel circuit used in the display device related to one embodiment of the present invention.
Figure 6:
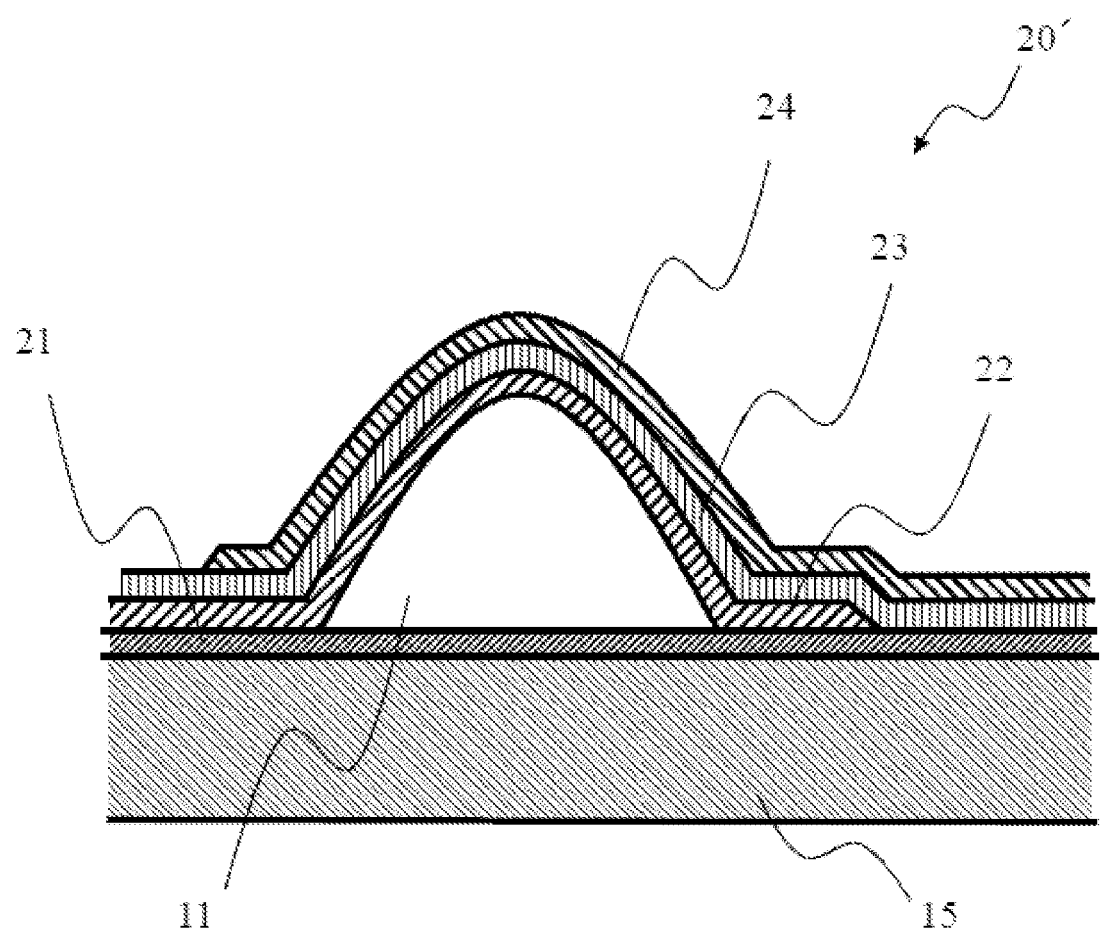
FIG. 6 is a cross-sectional diagram showing a modified example of the condenser related to the first embodiment shown in FIG. 5.

The structure of the condenser 10 arranged in a pixel circuit of the display device 100 related to one embodiment of the present invention is explained in more detail below while referring to FIG. 5 to FIG. 8, FIG. 3 and FIG. 4. FIG. 5 is a cross-sectional diagram which shows an approximate structure of a condenser 20 related to the first embodiment of the present invention. FIG. 6 is a cross-sectional diagram which shows a modified example of the condenser 20 related to the first embodiment shown in FIG. 5. FIG. 7A to FIG. 7D are diagrams for explaining a manufacturing process of a pixel circuit arranged with the condenser 20 related to the first embodiment shown in FIG. 5. FIG. 8 is a diagram which shows an approximate structural example of a display device which includes a pixel circuit arranged with the condenser 20 related to the first embodiment shown in FIG. 5.

As is shown in FIG. 5, the condenser 20 related to the first embodiment of the present invention includes the protruding portion 11 formed on the substrate 11, a barrier film 21 formed on the protruding portion 11, a semiconductor layer 22 formed on the barrier film 21, a gate insulation film 23 formed on the semiconductor layer 22 and a gate electrode layer 24 formed on the gate insulation film 23. By adopting this type of structure it is possible to form the condenser 20 using the semiconductor layer 22 and the gate electrode layer 24.

In addition, as is shown in FIG. 6 a condenser 20' may include the barrier film 21 which covers the substrate 15, the protruding portion 11 formed on the barrier film 21, the semiconductor layer 22 formed on the protruding portion 11, the gate insulation film 23 formed on the semiconductor layer 22 and the gate electrode layer 24 formed on the gate insulation film 23 as a modified example of the condenser 20 exemplified in FIG. 5. It is also possible to form the condenser 20' exemplified in FIG. 6 using the semiconductor layer 22 and the gate electrode layer 24.

A manufacturing process of a pixel circuit arranged with the condenser 20 related to the first embodiment of the present invention is described below while referring to FIG. 7A to FIG. 7D. FIG. 7A to FIG. 7D show a section formed with a TFT of a pixel circuit on the left side of the diagram and a section formed with the condenser 20 on the right side of the diagram.

Figure 7A:
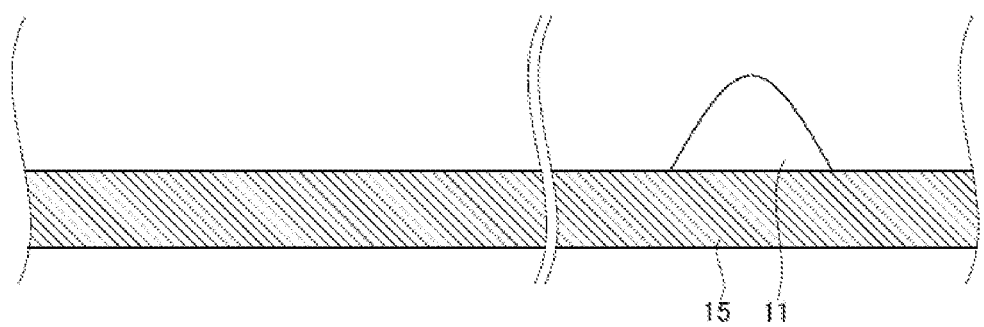
FIG. 7A is a diagram for explaining a manufacturing process of a pixel circuit arranged with the condenser related to the first embodiment shown in FIG. 5.
Figure 7A:
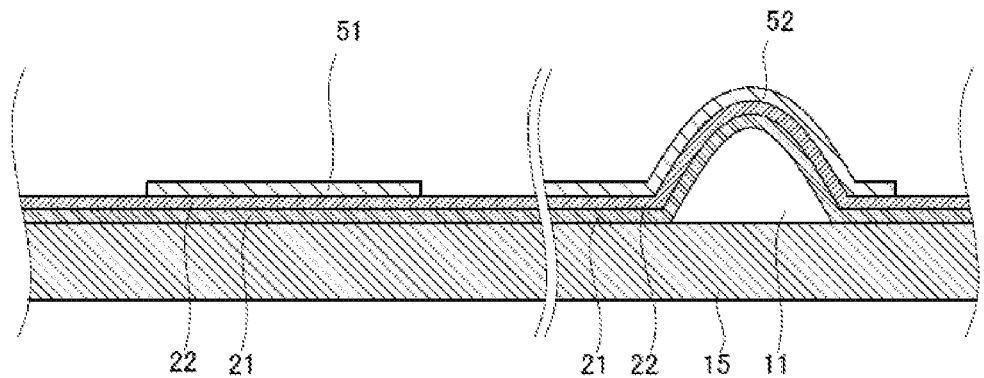
Figure 8:
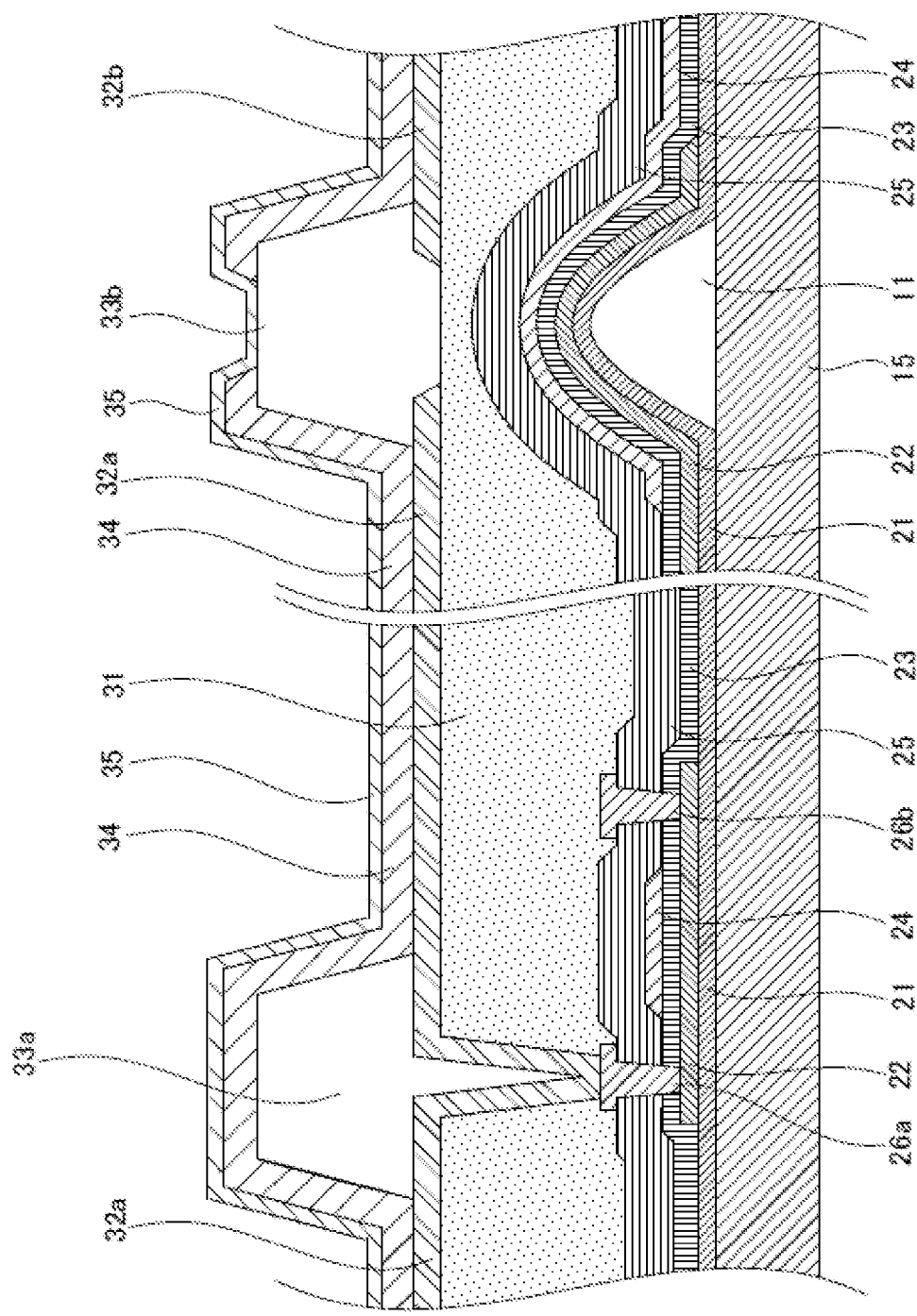
FIG. 8 is a diagram showing an approximate structural example of a display device including a pixel circuit arranged with the condenser circuit related to the first embodiment shown in FIG. 5.

(1) Formation of the Protruding Portion 11 (Refer to FIG. 7A (a))

The protruding portion 11 is formed on the substrate 15. A glass substrate is used as the substrate 15. As described above using FIG. 4, the protruding portion is formed with a protruding shape with a height of around 1 µm~10 µm from the substrate 15. The protruding portion 11 is preferred to be formed with a protruding shape having a smooth sloping surface with no corners and is formed by forming a silicon oxide film or silicon nitride film on the substrate 14 and by patterning this film. In addition, the protruding portion 11 may also be formed using a photolithography process using a resist. A material having high thermal stability is preferred in the case where a resist is used.

(2) Formation of the Barrier Film 21 and Semiconductor Layer 22 (Refer to FIG. 7A (b), (c))

The barrier film 21 is formed on the substrate 15 formed with the protruding portion 11 (FIG. 7A (b)). The barrier film 21 acts as a foreign object blocking film which prevents the agglomeration of an alkaline component such as sodium ions which exist within the substrate 15 which is a glass substrate and affecting the characteristics of the TFT. In addition, it is possible to prevent the shape of the protruding portion 11 from deforming by covering the portion with the barrier film 21. The barrier film 21 is formed using a silicon oxide film or silicon nitride film using a known technology (sputtering method, PCVD method or vacuum deposition method etc.).

An amorphous semiconductor film (a-Si film) is formed on the substrate 15 formed with the barrier film 21 using a known technology (sputtering method, PCVD method or vacuum deposition method etc.). The amorphous semiconductor film is formed by crystallization using a known technology such as laser irradiation and the semiconductor layer 22 which is a crystalline semiconductor layer (p-Si layer) is formed (FIG. 7A (b)).

Next, a pattered first resist (mask) 51 is formed on the semiconductor layer 22 on the side on which a TFT is formed and a patterned second resist 52 is formed on the semiconductor layer 22 on the side on which a condenser is formed (FIG. 7A (b)). A patterned semiconductor layer 22 is formed by performing an etching process of the semiconductor layer 22 formed with the first resist 51 and second resist 52 as is shown in FIG. 7B (a).

Figure 7B:
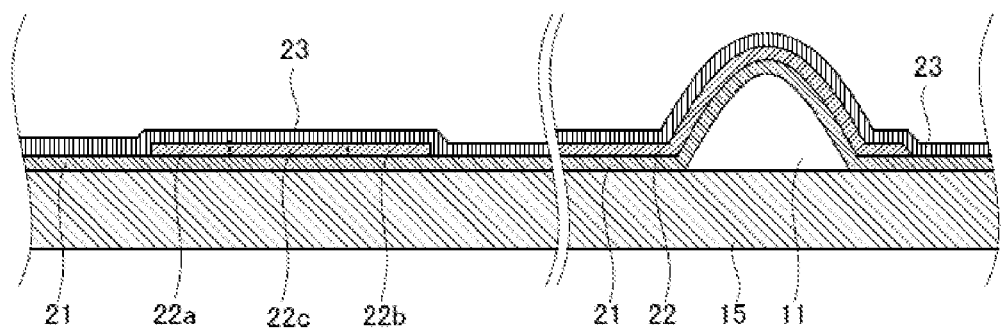
FIG. 7B is a diagram for explaining a manufacturing process of a pixel circuit arranged with the condenser related to the first embodiment shown in FIG. 5.
Figure 7B:
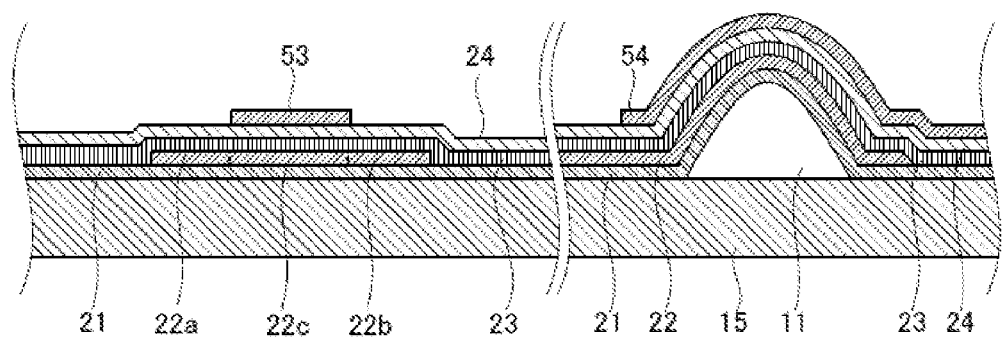

(3) Formation of the Gate Insulation Film 23 (Refer to FIG. 7B (a))

Next, the gate insulation film 23 which covers the semiconductor layer 22 is formed (FIG. 7B (a)). The gate insulation film 23 is formed with a silicon oxide film to a film thickness of around 100 nm using a known method such as a PECVD method. At this time, as is shown in FIG. 5, the film thickness t1 of the gate insulation film 23 formed on a sloping surface of the protruding portion 11 may become thinner than a film thickness t2 of the gate insulation film 23 formed flat on a horizontal surface of the substrate 15 by reduction in the film formation ratio. In this way, although pressure is reduced it is possible to form a large volume between the semiconductor layer 22 and the gate electrode layer 24 without increasing the area taken up by the condenser 20.

Next, a mask not shown in the diagram is formed on the gate insulation film 23 on a region 22c which becomes a channel region of the TFT shown in FIG. 7B (a). An impurity region 22a which becomes a drain region and an impurity region 22b which becomes a source region are formed and a p channel type TFT is formed from the top of the mask and passing through the gate insulation film to the semiconductor layer 22 by adding (doping) an impurity element such as boron for providing p type properties. At the same time, an impurity element is also added to the semiconductor layer 22 and the gate insulation film 23 which form the condenser 20. Furthermore, an LDD region may also be formed by channel doping according to necessity. In addition, in the case where an n channel type TFT is formed instead of a p channel type TFT, the impurity regions 22a and 22b may be formed by adding (doping) an impurity element such as phosphorous for providing n type properties.

(4) Formation of the Gate Electrode Layer 24 (Refer to FIG. 7B (b), 7C (a))

Next, the gate electrode layer 24 is formed on the gate insulation film 23 (FIG. 7B (b)). The gate electrode layer 24 is formed by a known method using an element selected rom Ta, W, Ti, Mo, Al, Cu, Cr, Nd or an alloy material with one of these elements as the main component or a compound material.

Next, a patterned third resist 53 is formed on the gate electrode layer 24 on the side formed with the TFT and a patterned fourth resist 54 is formed on the gate electrode layer 24 on the side formed with the condenser (FIG. 7B (b)). The patterned gate electrode layer 24 is formed by performing an etching process of the gate electrode layer 24 formed with the third resist 53 and fourth resist 54 as is shown in FIG. 7C (a).

Figure 7C:
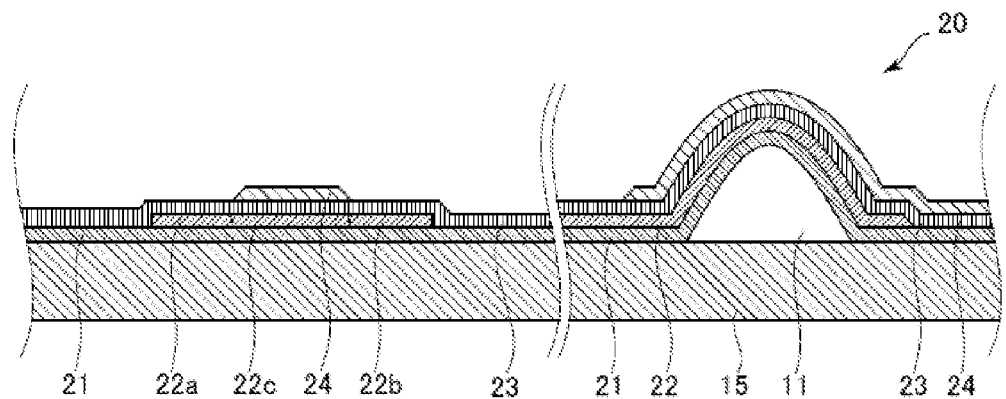
FIG. 7C is a diagram for explaining a manufacturing process of a pixel circuit arranged with the condenser related to the first embodiment shown in FIG. 5.
Figure 7C:
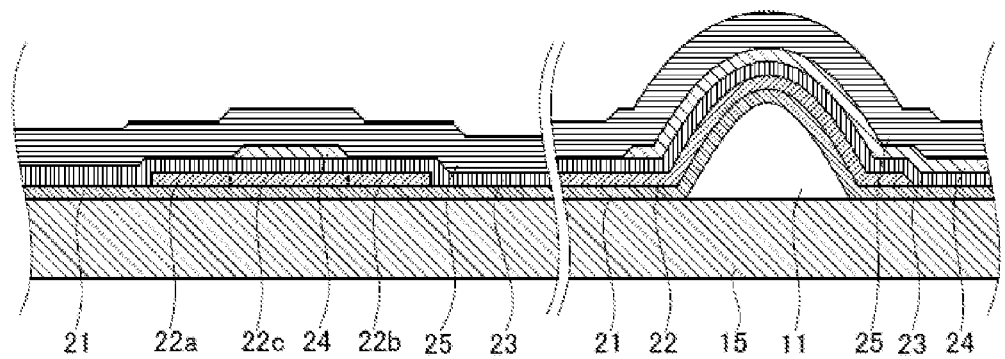

(5) Formation of an Interlayer Insulation Film 25 (Refer to FIG. 7C (b))

Next, an interlayer insulation film 25 is formed. The interlayer insulation film 25 is formed using a silicon oxide film or silicon nitride film to a film thickness of around 500 nm~600 nm using a known technology (sputtering method, PCVD method or vacuum deposition method etc.). In addition, the film may be formed using a resin such as polyimide or acrylic etc.

Figure 7D:
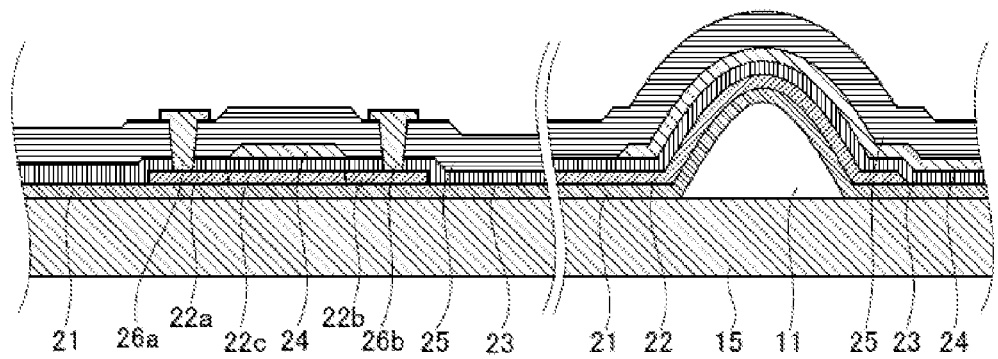
FIG. 7D is a diagram for explaining a manufacturing process of a pixel circuit arranged with the condenser related to the first embodiment shown in FIG. 5.
Figure 7D:
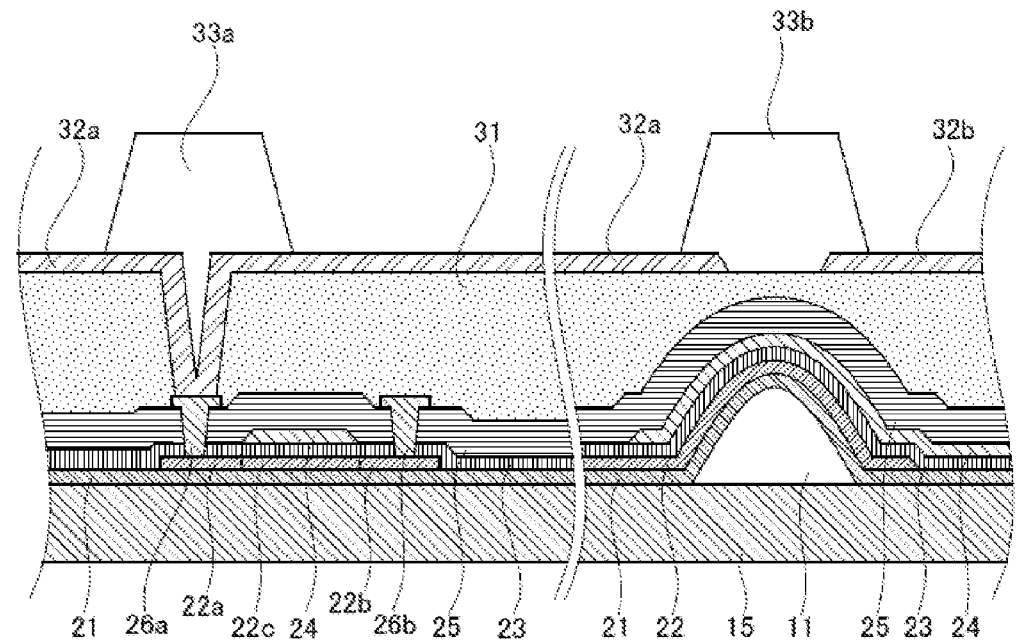

(6) Formation of a Drain Electrode 26a and Source Electrode 26b (Refer to FIG. 7D (a))

Next, after forming contact holes which reach the impurity region 22a and impurity region 22b respectively in the interlayer film 25 and gate electrode 23, a drain electrode 22a and source electrode 26b are formed passing through the contact holes and electrically connected to the impurity region 22a which is a drain region and the impurity region 22b which is a source region respectively. The drain electrode 26a and source electrode 26b may be formed by using an element selected rom Ta, W, Ti, Mo, Al, Cu, Cr, Nd or an alloy material with one of these elements as the main component or a compound material and by patterning this film. In addition, although not shown in the diagram, as well as forming the drain electrode 26a and source electrode 26b, a wiring layer electrically connected to the drain electrode 26a and source electrode 26b by patterning.

(7) Formation of a Flat Film 31, Pixel Electrode 32 and Bank Layer 22 (Refer to FIG. 7D (b))

Next, a flat film 31 is formed. The flat film 31 is formed using a polyimide resin for example to a film thickness of around 1 nm~10 nm. After forming a contact hole which reaches the drain electrode 26a in the flat film 31, pixel electrodes 32a and 32b electrically connected to the drain electrode 26a are formed passing through the contact hole. Bank layers 33a, 33b are formed on the pixel electrodes 32a, 32b as shown in FIG. 7D (b). Furthermore, the pixel electrodes 32a and 32b shown in FIG. 7D (b) are pixel electrodes of mutually adjacent pixels and the bank layer 33b is formed in a position which separates the pixel electrodes 32a, 32b of mutually adjacent pixels.

Here, in the present embodiment, the bank layer 33b which mutually intercedes the adjacent pixel electrodes 32a, 32b is formed in a position which overlaps the condenser 20. As is shown in FIG. 7D (b), because it is possible to set an asperity which can just be formed on the flat film 31 via the condenser 20 between adjacent pixels by formation in an overlapped position corresponding to the peak section of the protruding portion 11 of the condenser 20, it is possible to form the pixel electrodes 32a and 32b flat. Furthermore, the condenser 20 may also be formed in a position which does not overlap the bank layer 33b.

The pixel circuit arranged with the condenser 20 related to the first embodiment of the present invention is formed using the manufacturing process described above. The condenser 20 related to the first embodiment of the present invention can be formed at the same time as forming a TFT and a three-dimensional volume can be formed between the semiconductor layer 22 and the gate electrode layer 24. Therefore, it is possible to form a pixel circuit arranged with the condenser 20 which can hold a required electrical charge without increasing the area taken up for each pixel in a simple manufacturing process. It is possible to provide a display device with high definition and improved display capabilities by forming the display device with this type of pixel circuit.

After forming a pixel circuit arranged with the condenser 20 related to the first embodiment using the manufacturing process exemplified in FIG. 7A to FIG. 7D, an organic EL display device may be formed by forming an organic EL layer 34 and a cathode electrode 35 on the pixel electrodes 32a, 32b as is shown in FIG. 8. Furthermore, the structure of an organic EL element including the pixel electrodes 32a, 32b, organic EL layer 34 and cathode electrode 35 shown in FIG. 8 is a structural example according to a side-by-side RGB sub-pixel method and can be formed using a known technology. In addition, a pixel circuit arranged with the condenser 20 related to the first embodiment of the present invention can also be applied to an organic EL element which uses a color filter method for example by combining a white light emitting layer and a color filter. In this way, an organic EL display device applied with the present invention can also be applied to various organic EL display devices without being limited to the structure exemplified in FIG. 8.

Second Embodiment

Figure 9:
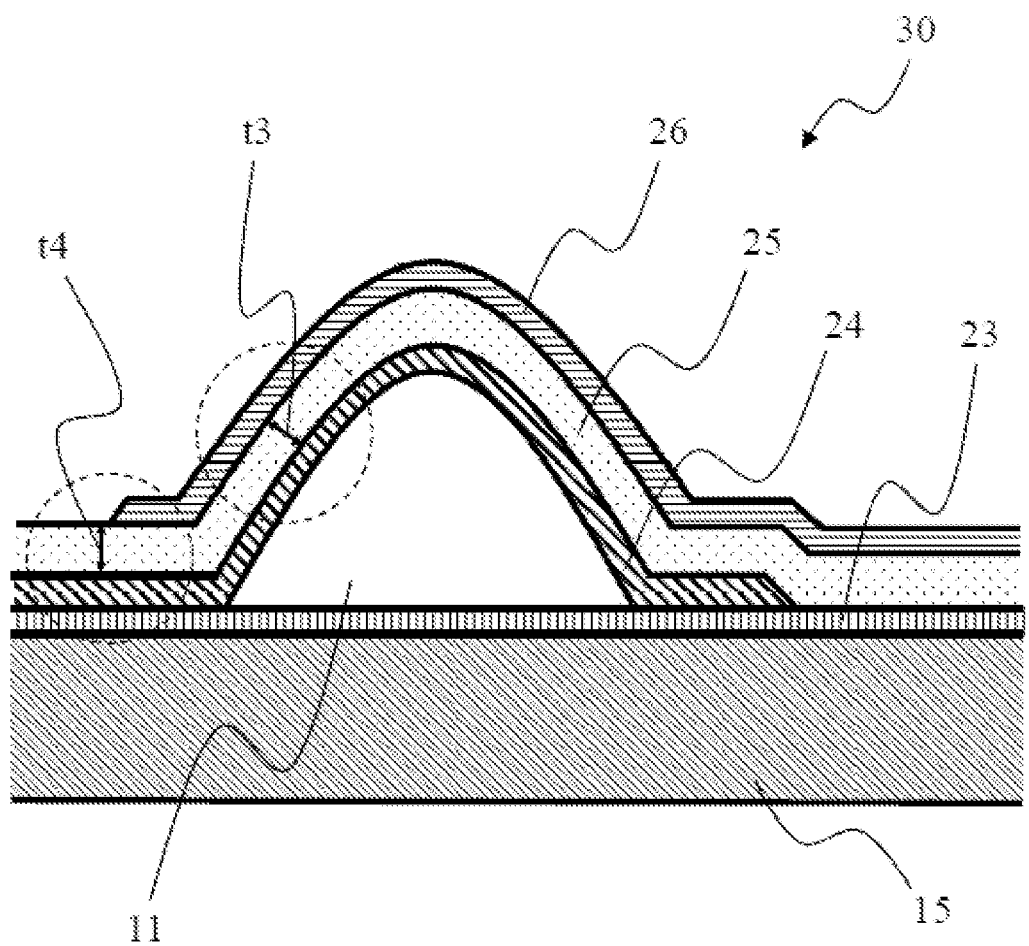
FIG. 9 is a cross-sectional diagram showing an approximate structural example of the condenser related to a second embodiment including in a pixel circuit used in a display device related to one embodiment of the present invention.
Figure 11:
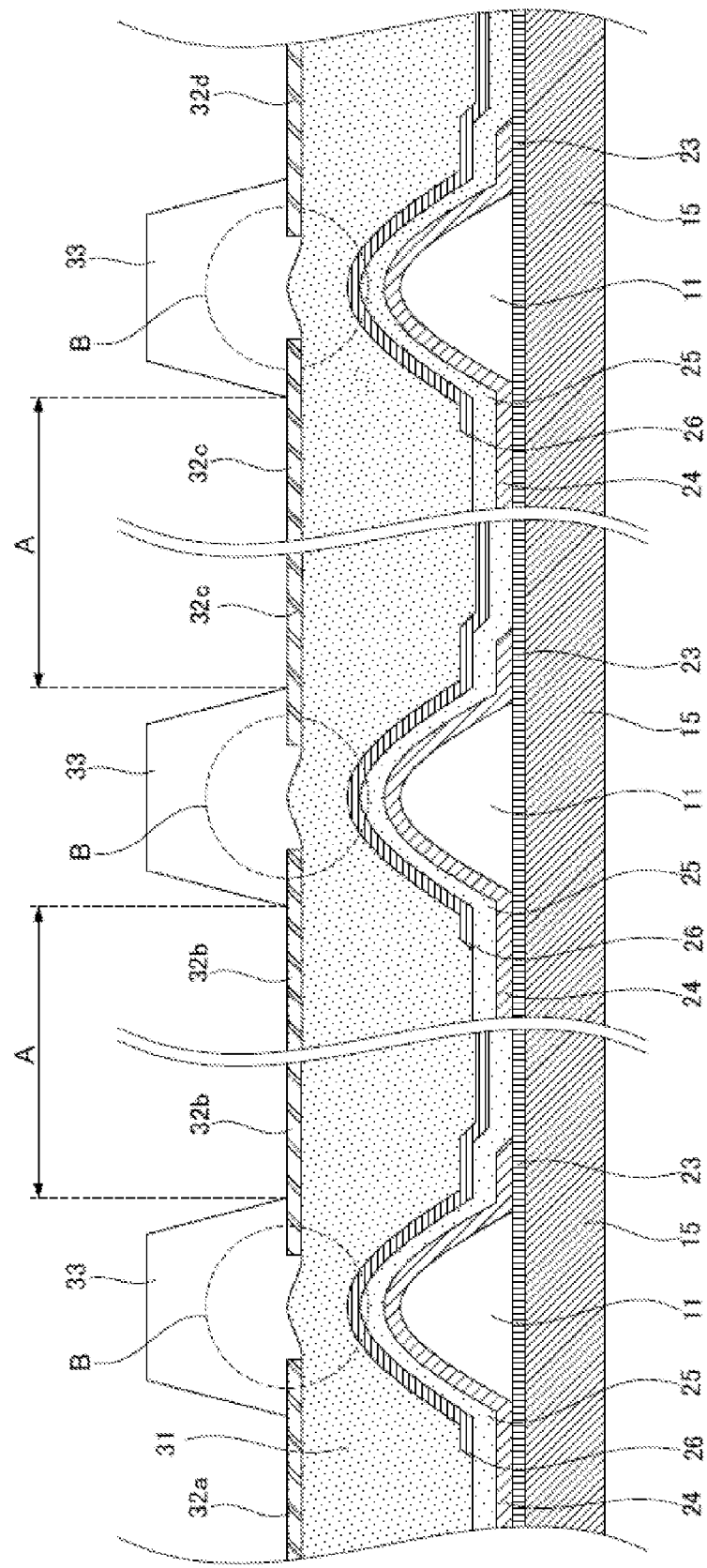
FIG. 11 is a diagram for explaining an approximate structural example of a display device including a pixel circuit arranged with the condenser related to the second embodiment shown in FIG. 9.

The structure of a condenser 30 related to a second embodiment arranged in a pixel circuit of a display device related to the first embodiment of the present invention is explained herein while referring to FIG. 9 to FIG. 11. FIG. 9 is a cross-sectional diagram which shows an approximate structure of the condenser 30 related to the second embodiment included in the pixel circuit used in the display device related to one embodiment of the present invention. FIG. 10 is a diagram which shows an approximate structure of a display device including the pixel circuit arranged with the condenser 30 related to the second embodiment shown in FIG. 9. FIG. 11 is a diagram for explaining a structural example of the display device including the pixel circuit arranged with the condenser 30 related to the second embodiment shown in FIG. 9. Furthermore, in FIG. 9 to FIG. 11, because the same reference symbols are attached to the same structural parts as the structure in the first embodiment described above while referring to FIG. 5 to FIG. 8, those explanations are omitted.

As is shown in FIG. 9, the condenser 30 related to the second embodiment of the present invention includes a gate insulation film 23 formed on a substrate 15, a protruding portion 11 formed on the gate insulation film 23, a gate electrode layer 24 formed on the protruding portion 11, and interlayer insulation film 25 formed on the gate insulation layer 24, and a wiring layer 26 formed on the interlayer insulation film 25. Furthermore, the wiring layer 26 is formed by patterning when forming a drain electrode 26a and source electrode 26b using the same material as the drain electrode 26a and source electrode 26b (refer to FIG. 10). The condenser 30 arranged with this structure can be manufactured using the same manufacturing process as the manufacturing process as the condenser 20 related to the first embodiment described above while referring to FIG. 7A to FIG. 7D. Therefore, it is also possible form the condenser 30 as the same time as forming a TFT when forming a TFT of a pixel circuit the same as the condenser 20 and it is possible to form a three-dimensional volume between the gate electrode layer 24 and wiring layer 26 without increasing the area taken up in pixel circuit.

Referring to FIG. 9 and FIG. 10, the condenser 30 related to the second embodiment of the present invention is different to the condenser 2 related to the first embodiment in that a volume is formed by the gate electrode layer 24 and the wiring layer 26. Because a film thickness t3 of the interlayer insulation film 25 formed with the volume of the condenser 30 becomes thinner than a film thickness t4 of the interlayer insulation film 25 formed flat on a horizontal surface of the substrate 15 by forming the volume on a sloping surface of the protruding portion 11, it is possible to obtain a larger volume than the volume formed on a flat section. In addition, because the film thickness becomes thicker when compared to the film thickness t1 of the gate insulation film 23 of the condenser 20 related to the first embodiment shown in FIG. 5, it is possible to obtain the merit of holding a larger volume even with the same area while maintaining pressure and when the film thickness t3 on the sloping surface of the protruding section 11 becomes thinner using the condenser 30.

In addition, the condenser 30 related to the second embodiment in a display device may be arranged corresponding to a position which overlaps the bank layer 33b which mutually isolates the pixel electrodes 32a, 32b of adjacent pixels the same as condenser 20 related to the first embodiment. In this way, as is shown in FIG. 11, it is possible to planarize a region A of the pixel electrodes 32a~32d formed with an organic EL element also in the case where the flat film 31 is raised up by the condenser 30 and an asperity shaped part B is formed on the surface. Therefore, it is possible to accurately form a structure on the pixel electrodes 32a~32d and in the case where light passes through the region A it is possible to prevent impedance of the display of each pixel by the condenser 20 and the asperity shaped part B of the surface of the flat film 31.

Furthermore, although the structure of a display device including a pixel circuit arranged with the condensers 20, 30 related to the first and second embodiments of the present invention described above was explained using the case where the structure of a TFT is a top gate type as shown in FIG. 8 and FIG. 10 for example, the present invention is not limited to this structure. The structure of a TFT may also be applied to a bottom gate type display device. In addition, the structure of the organic EL element shown in FIG. 8 and FIG. 10 is not limited to this structure and a bottom emission type of top emission type organic EL display device may be formed by appropriately changing the stacking order of each layer and material used according to specifications. In this way, it is possible to apply the present invention to various display devices.

As described above, it is possible to form a pixel circuit arranged with the condenser 30 related to the second embodiment of the present invention which can hold a necessary potential without increasing the area taken up using a simple manufacturing process the same as the condenser 20 related to the first embodiment of the present invention. Therefore, by forming a display device including a pixel circuit arranged with the condenser 20 and condenser 30 related to the first and second embodiments of the present invention it is possible to provide a display device with high definition and improved display capabilities.

What is claimed is:

1. A display device comprising:
a plurality of pixels, each of the plurality of pixels being arranged with a thin film transistor and a condenser;
wherein
the condenser includes
a protruding portion having a certain height and located above a horizontal surface of a substrate;
a first electrode arranged along the horizontal surface of the substrate and the protruding portion;
an insulation film arranged on the first electrode; and
a second electrode arranged on the insulation film, wherein
the thin film transistor includes a stacked structure including a semiconductor layer, a gate insulation film and a gate electrode layer, and the first electrode of the condenser is the semiconductor layer, the insulation film of the condenser is the gate insulation film, and the second electrode of the condenser is the gate electrode layer.

2. The display device according to claim 1, wherein each of the plurality of pixels includes an organic EL element.

3. The display device according to claim 2, wherein a bank layer is arranged at a position overlapping the condenser.

4. The display device according to claim 1, wherein each of the plurality of pixels includes a liquid crystal layer.

5. The display device according to claim 1, wherein a film thickness of the gate insulation film arranged on a sloping surface of the protruding portion is thinner than a film thickness of the gate insulation film arranged on a horizontal surface of the substrate.

6. The display device according to claim 1, wherein the protruding portion is a silicon oxide film, silicon nitride film or light-curing resin.

7. The display device according to claim 1, wherein the protruding portion has a mountain shape.

8. The display device according to claim 1, wherein the protruding portion includes a flat part at a peak.

9. The display device according to claim 1, wherein the height of the protruding portion is 1 µm or more and 10 µm or less.

10. The display device according to claim 1, wherein the protruding portion has a sloping surface, and
the first electrode overlaps the sloping surface.

11. The display device according to claim 1, wherein the protruding portion has a surface protruding from a substrate side to a second electrode side, and
the first electrode overlaps an entirety of the surface.

12. A display device comprising:
a plurality of pixels arranged in a matrix shape on a substrate at a position where a plurality of control signal lines and a plurality of data signal lines intersect; and
a plurality of pixel circuits arranged corresponding to the plurality of pixels respectively, the plurality of pixel circuits receiving a data voltage supplied from the plurality of data signal lines;
wherein
each of the plurality of pixel circuits includes a thin film transistor controlling programming of the data voltage supplied to each of the plurality of pixels according to a control signal supplied from the plurality of control signal lines, and a condenser holding the data voltage;
the condenser includes
a protruding portion having a certain height and located above a horizontal surface of the substrate;
a first electrode arranged along the horizontal surface of the substrate and the protruding portion;
an insulation film arranged on the first electrode; and
a second electrode arranged on the insulation film, wherein
the thin film transistor includes a stacked structure including a semiconductor layer, a gate insulation film and a gate electrode layer, and the first electrode of the condenser is the semiconductor layer, the insulation film of the condenser is the gate insulation film, and the second electrode of the condenser is the gate electrode layer.

13. The display device according to claim 12, wherein each of the plurality of pixels includes an organic EL element.

14. The display device according to claim 13, wherein a bank layer is arranged at a position overlapping the condenser.

15. The display device according to claim 12, wherein each of the plurality of pixels includes a liquid crystal layer.

16. The display device according to claim 12, wherein a film thickness of the gate insulation film arranged on a sloping surface of the protruding portion is thinner than a film thickness of the gate insulation film arranged on a horizontal surface of the substrate.

17. The display device according to claim 12, wherein the protruding portion has a sloping surface, and
the first electrode overlaps the sloping surface.

18. The display device according to claim 12, wherein the protruding portion has a surface protruding from a substrate side to a second electrode side, and
the first electrode overlaps an entirety of the surface.

* * * * *